(12) United States Patent
Hartmann et al.

(10) Patent No.: US 11,433,357 B2
(45) Date of Patent: Sep. 6, 2022

(54) POTTING OR BONDING COMPOSITION FOR FILTRATION MEMBRANE MODULES

(71) Applicants: Henkel AG & Co. KGaA, Duesseldorf (DE); Henkel IP & Holding GmbH, Duesseldorf (DE)

(72) Inventors: Olaf Hartmann, Duesseldorf (DE); Thomas Kamm, Duesseldorf (DE); Juliane Kutter, Duesseldorf (DE); Jose Garcia Miralles, Duesseldorf (DE); Yongxia Brigitte Wang, Bridgewater, NJ (US); Michael M. Izzo, South Windsor, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 46 days.

(21) Appl. No.: 16/906,582

(22) Filed: Jun. 19, 2020

(65) Prior Publication Data

US 2020/0316530 A1 Oct. 8, 2020

Related U.S. Application Data

(63) Continuation of application No. PCT/EP2018/082996, filed on Nov. 29, 2018.

(30) Foreign Application Priority Data

Dec. 21, 2017 (EP) .................................. 17209304

(51) Int. Cl.
*B01D 69/08* (2006.01)
*B01D 63/02* (2006.01)
(Continued)

(52) U.S. Cl.
CPC ............. *B01D 69/08* (2013.01); *B01D 63/02* (2013.01); *B01D 63/10* (2013.01); *B01D 71/38* (2013.01)

(58) Field of Classification Search
CPC ........ B01D 69/08; B01D 63/02; B01D 63/10; B01D 71/38; B01D 2313/04; B01D 65/022; B01D 65/003; B01D 63/023
See application file for complete search history.

(56) References Cited

U.S. PATENT DOCUMENTS 3,367,504 A 2/1968 Westmoreland
3,417,870 A 12/1968 Bray
(Continued)

FOREIGN PATENT DOCUMENTS

EP 0251620 A2 1/1988
EP 0429169 A1 5/1991
(Continued)

OTHER PUBLICATIONS

B. Wunderlich in Thermal Analysis, Academic Press, Inc., 1990 (Book).
(Continued)

*Primary Examiner* — Krishnan S Menon
(74) *Attorney, Agent, or Firm* — James E. Piotrowski (57) ABSTRACT

The present invention provides a membrane filtration module comprising a housing in which the filtration membrane is disposed in a fixed positional relationship by a potting or bonding material obtained by the curing of a two component (2K) composition consisting of: a first component (A) comprising at least one compound (a) having at least two acetoacetate functional groups; and, a second component (B) comprising at least one compound (b) having at least one amino group, each said amino group being a primary or secondary amino group.

16 Claims, 3 Drawing Sheets

(51) Int. Cl.
  *B01D 63/10* (2006.01)
  *B01D 71/38* (2006.01)

(56) References Cited

U.S. PATENT DOCUMENTS

| | | | |
|---|---|---|---|
| 3,493,496 | A | 2/1970 | Bray et al. |
| 3,504,796 | A | 4/1970 | Bray |
| 4,227,295 | A | 10/1980 | Bodnar et al. |
| 4,235,723 | A | 11/1980 | Bartlett, Jr. |
| 4,389,363 | A | 6/1983 | Molthop |
| 6,290,756 | B1 | 9/2001 | Macheras et al. |
| 6,648,945 | B1 | 11/2003 | Takeda et al. |
| 6,974,554 | B2 | 12/2005 | Cox et al. |
| 7,005,100 | B2 | 2/2006 | Lowell |
| 7,022,231 | B2 | 4/2006 | Mahendran et al. |
| 7,931,463 | B2 | 4/2011 | Cox et al. |
| 8,518,256 | B2 | 8/2013 | Cox et al. |
| 8,758,621 | B2 | 6/2014 | Zuback |
| 2006/0150373 | A1 | 7/2006 | Hoover |
| 2007/0151666 | A1 | 7/2007 | Moeller et al. |
| 2016/0096142 | A1* | 4/2016 | Harris ............... B01D 63/023 210/496 |
| 2016/0096144 | A1* | 4/2016 | Harris ............... B01D 63/103 210/457 |
| 2016/0145476 | A1 | 5/2016 | Jordan, Jr. et al. |
| 2017/0189860 | A1 | 7/2017 | Tanizaki et al. |

FOREIGN PATENT DOCUMENTS

| | | |
|---|---|---|
| WO | 9303063 A1 | 2/1993 |
| WO | 0035567 A1 | 6/2000 |
| WO | 2011039318 A1 | 4/2011 |
| WO | 2016049281 A1 | 3/2016 |
| WO | 2016054367 A1 | 4/2016 |
| WO | 2016054380 A1 | 4/2016 |
| WO | 2017186899 A1 | 11/2017 |

OTHER PUBLICATIONS

B. Cassel and M. P. DiVito in "Use of DSC To Obtain Accurate Thermodynamic and Kinetic Data", American Laboratory, Jan. 1994, pp. 14-19.
Witzeman, J.Stewart & Nottingham, W.Dell & Rector, F. Del. (1990). Comparison of methods for the preparation of acetoacetylated coating resins. Journal of Coatings Technology. 62. 101-112. (only newest vols. available online, starting vol. 67).
International Search Report for International PCT Patent Application No. PCT/EP2018/082996 dated Mar. 7, 2019.
https://www.sswm.info/content/membrane-filtration.
Radcliff et al. Application of Membrane Technology to the Production of Drinking Water, Water Conditional & Purification (2004).
Witzeman et al. "Transacetoacetylation with tert-butyl acetoacetate: Synthetic Applications", J. Org. Chemistry 1991, 56, 1713-1718.
Deutsche (DGF) Einheitsmethoden zur Untersuchung von Fetten, Fettprodukten, Tensiden und verwandten Stoffen Gesamtinhaltsverzeichnis 2016) C-V 17a (53).
Harris et al., "New ICF Potting System Overcomes Challenges for Manufacturers of Hollow Fiber Filters," H.B. Fuller, 4 pages.

* cited by examiner

POTTING OR BONDING COMPOSITION FOR FILTRATION MEMBRANE MODULES

FIELD OF THE INVENTION

The present invention is directed to potting compositions and bonding compositions for membrane modules used in filtration processes. More particularly, the present invention is directed to an isocyanate-free, two component (2K) potting or bonding composition having a first component comprising a compound having at least two acetoacetoxy groups and a second component comprising at least one nitrogen-containing compound having at least one carbonyl group-reactive amine nitrogen atom, which composition is effective as a sealant within filtration membrane modules.

BACKGROUND TO THE INVENTION

Filtration is the process of separating, fractionating or concentrating particles, molecules or ions within or from a fluid by forcing the material—under the influence of pressure, vacuum, concentration gradient, valence or electrochemical affinity—through a porous or semi-porous barrier or filtration medium. Whilst known filtration media are often classified as depth filters, screen filters (mesh) or membranes, the present application is concerned with membrane filtration, which method finds utility in applications as divergent as purification, diafiltration, desalination, particle fractionation, molecular concentration, molecular separation, fluid sterilization and fluid clarification.

As is established in the art, most membrane filters are either ceramic or synthesized from polymers, such as polysulfone and cellulose acetate, by processes including solvent casting, sintering, stretching or nuclear particle track etching. Each of these processes produces a thin membrane with a relatively well defined flow rate, pore size, pore structure, pore density, bubble point and tensile strength. Due to these predefined characteristics, the filtration efficiency of membrane filters can be accurately predicted under different process conditions. For example, the structure and rated pore size of a microporous membrane filter will establish what matter will be surface captured or rejected by the membrane and, further, whether interstitial entrapment of particles smaller than the rated pore size will occur.

The attention of reader is here directed to https.//www.ss-wm.info/content/membrane-filtration and Radcliff et al. Application of Membrane Technology to the Production of Drinking Water, Water Conditional & Purification (2004) which detail the general relationship between the process of separation—particulate filtration, microfiltration, ultrafiltration, nanofiltration and reverse osmosis (ultrafiltration)—and pore size of the filtration membrane. There is no intention to restrict the present invention to any particular pore size, membrane structure or applicable separation process. Rather, the present application is concerned with modular membranes either of a self-contained configuration or being of the open-immersion type. As self-contained (or housed) membrane modules are the most common configuration for microfiltration, ultrafiltration, nanofiltration and reverse osmosis (ultrafiltration), they are the primary focus of the present invention but it will be recognized that the in situ application of a potting composition or a bonding composition to a framed or supported membrane module which is otherwise exposed to the liquid medium in which it is disposed is also envisaged.

Figure 1:
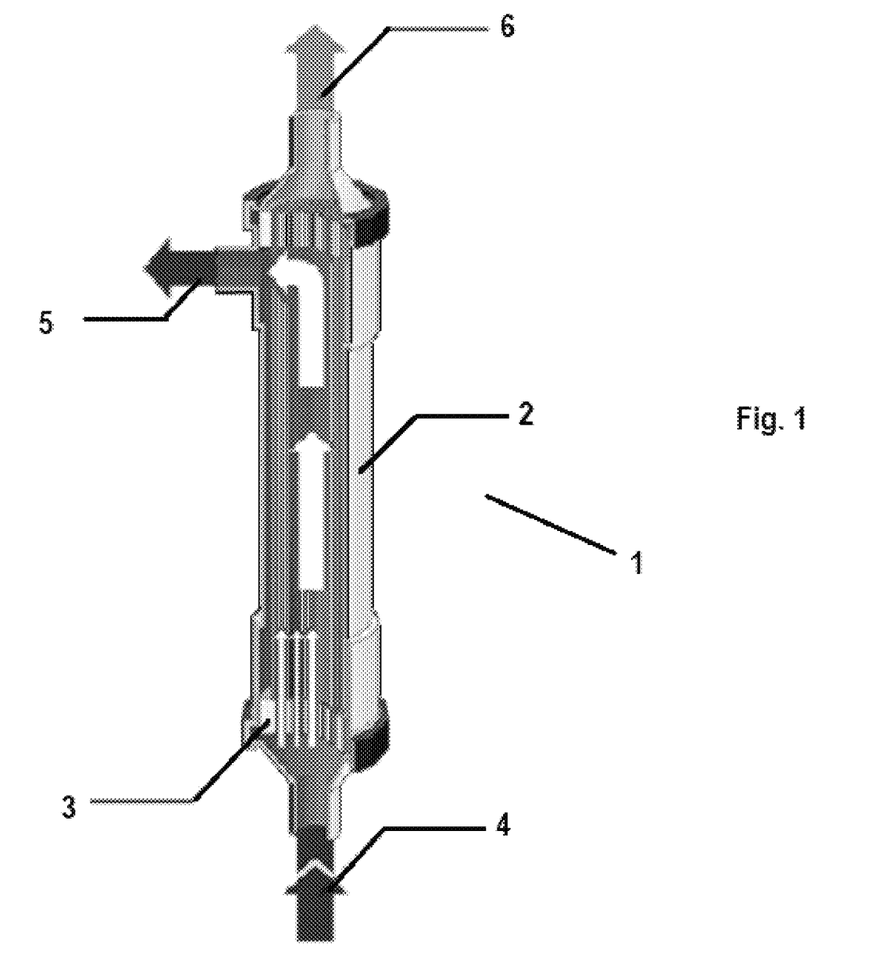
FIG. 1 appended hereto represents a generalized structure of a housed membrane module as applicable to the present application.

As shown in FIG. 1, the module (1) is provided with a housing (2) in which the membrane is disposed and affixed using a potting material (3). The feed (4) is introduced into the module (1) and the reject (5) and permeate (6) are withdrawn there from. Alternative feed, reject and permeate withdrawal points are possible but are not illustrated. However, all feed, concentrate, and filtrate piping connections are integral to the module (1).

Such housed membrane filters are primarily available as hollow fibers and flat sheets provided in pleated, stacked or spiral wound configurations, as described herein below. Moreover, the constituent membranes of the module (1) may further be classified as composite, supported or integral: composite membranes comprise a very thin retentive layer attached to a preformed porous support; in a supported membrane, the actual membrane is attached to a strong sheet material of negligible retentivity; and, integral type membranes are formed in one and the same operation having layers of the same composition.

Figure 2:
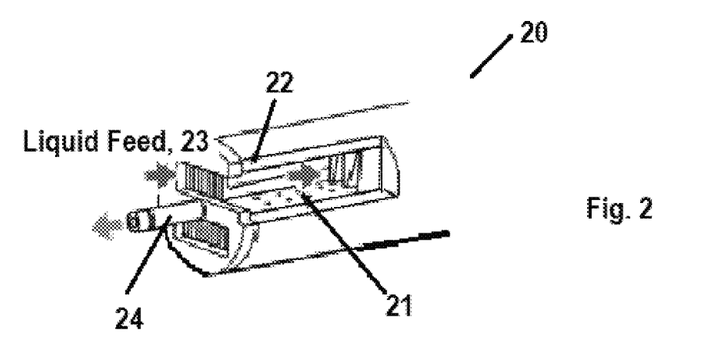
FIG. 2 represents an exemplary and non-limiting embodiment of a pleated flat-sheet membrane which may disposed within the housing of FIG. 1.

FIG. 2 illustrates a housing (20) having a collection head (21) and enclosing a pleated flat sheet membrane (22) which may be of particular utility to microfiltration applications: a liquid feed (23), such as raw water, is passed through the membrane and the permeate is withdrawn through tube (24).

Figure 3A:
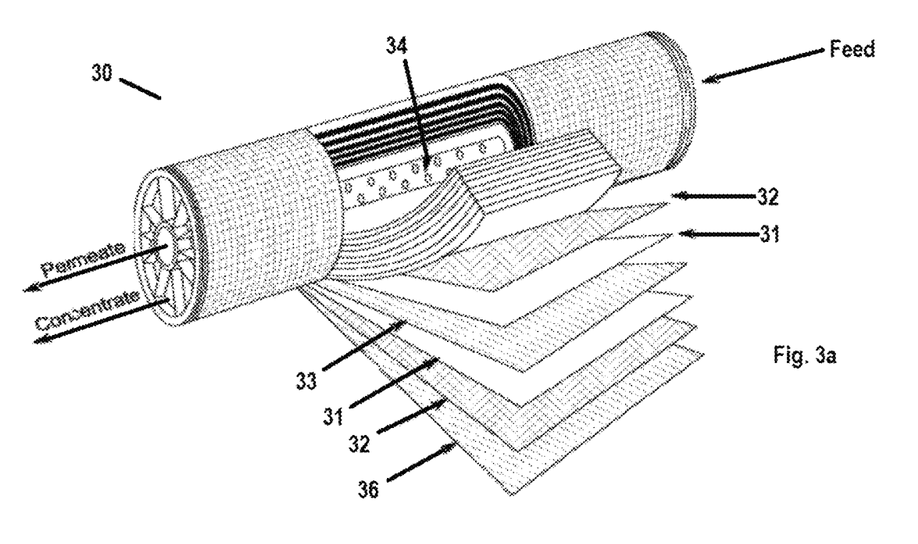
FIGS. 3a and 3b are representations of an exemplary and non-limiting embodiment of a spiral would membrane which may be disposed within the housing of FIG. 1.

FIG. 3a shows a spiral wound membrane module (30). The primary component is the separation membrane (31), which is formed into a flat sheet and which conventionally comprises a lamina of backing material. Other significant internal components are a feed channel spacer (32), a permeate spacer or permeate collection material (33), a permeate collection tube or center tube (34) and an end surface holder or anti-telescoping device (35) disposed at each end of the module (30). The membrane (31) is arranged to form an envelope around the permeate spacer (33): the term "membrane leaf" is utilized in the art to define two membrane sheets (31) disposed back-to-back with a permeate spacer (33) disposed there-between. The feed channel spacer (32) is placed over the envelope. The envelope and feed channel spacer (32) are wound around the center tube (34). Feed fluid can access the surface of the membrane (31) by flowing into the edge of and across the feed channel spacer (32), which spacer creates turbulence in the feed flow path. Permeate passes through the membrane (31), then flows through the permeate spacer (33) and center tube (34). Concentrate flows out of the downstream edge of the feed channel spacer (32) to leave the module (30). The anti-telescoping devices (35) are bonded to the center tube (34) and also held in place by an outer wrap (36). The anti-telescoping devices (35) prevent the envelopes from being pushed along the length of the center tube (34) by the feed fluid.

Figure 3B:
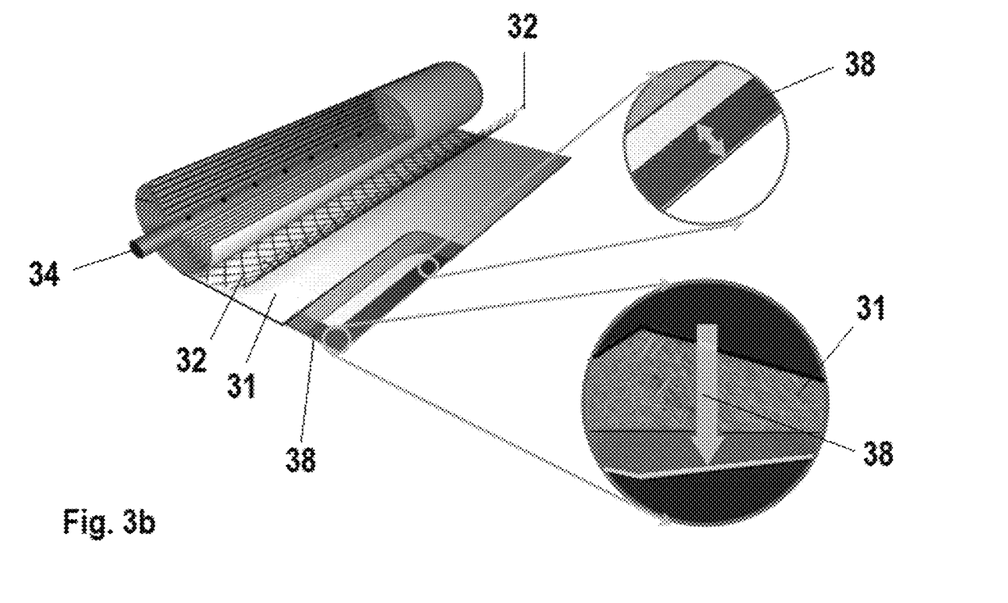

Whilst the membrane sheets (31) may be edge-sealed by heating, adhesives (38) may also be used for this purpose, as shown in FIG. 3b. Suitable adhesive compositions must have a closely controlled viscosity to moderate the penetration and horizontal spread of the composition shown in the inserts of FIG. 3b. Where the adhesive has too low a viscosity, it tends both to horizontally spread and to wick or rise up through the capillaries of the membrane (31) and, where applicable, any support present, thereby creating voids and reducing the initial integrity of the membrane leaf: this can be particularly problematic for asymmetric membranes. Conversely, if the adhesive composition has too high a viscosity, there may be insufficient wicking and sharp interfacial transitions exist within the membrane leaf which can promote structural failure. In addition, the adhesive also needs to have a certain open time that will allow the reactive adhesive to penetrate through the membrane and properly seal it before curing is too advanced. Providing a reactive adhesive which combines all those features is still a challenge in present industry.

Spiral wound membranes of this structure-type are disclosed in the following citations which are herein incorporated by reference: U.S. Pat. Nos. 4,235,723; 3,367,504; 3,504,796; 3,493,496; EP 0251620 A2; and, U.S. Pat. No. 3,417,870.

Figure 4:
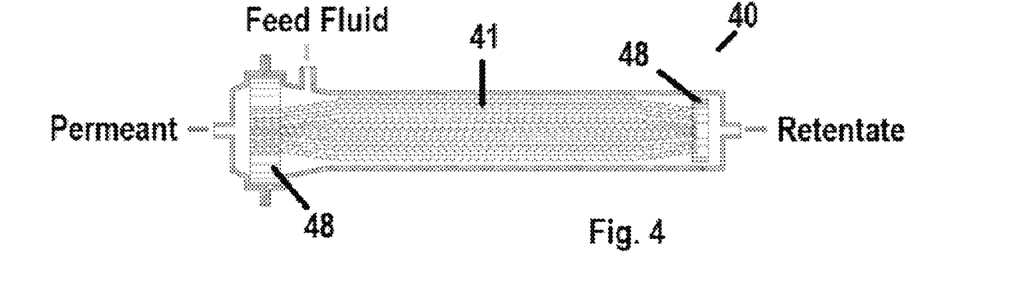
FIG. 4 represents an exemplary and non-limiting embodiment of a hollow fiber filtration membrane module.

Hollow fiber membrane modules are preferred in many applications—and in particular in reverse osmosis and ultra-filtration applications—on account of their cost, disposability, superior flow dynamics and achievable packing density. FIG. 4 exemplifies a housing (40) enclosing a hollow fiber membrane: therein hollow fibers (41) are disposed within the housing and are affixed using a potting material (48). During conventional potting operations of devices of this kind, the plurality or bundle of fibers (41) is inserted into its housing (48), and then the liquid potting compound impregnates the ends of the bundle while the housing is spun about a central axis to hold the potting compound at the ends of the bundle.

Conventionally, the degree of penetration of potting material into the bores of the hollow fibers (or capillary tubing) at both ends thereof is substantially less than the level of potting material permeating the bundle outside of the bores, because the air inside of the bores is compressed as the potting material advances into the bores from both ends, causing a counter-pressure which inhibits the advance of potting material into the bores. As the result of this, when the potting composition is cured, one can cut transversely through the middle of the potting composition at the ends of each bundle to expose open bores, which is necessary in order to obtain an operable filtration membrane.

The hollow fibers (41) have been depicted here as being crimped but this is for illustration only as other structures are known in the art. Moreover, in important commercial variants, hollow fiber membranes are composed of a gas permeable composite membrane formed of a gas permeable homogeneous layer and a porous support layer onto which the homogeneous layer is disposed.

In the context of the present application, the configuration of the hollow fiber membrane module is not limited to that illustrated in FIG. 4. The module may, for instance, further include one or more devices for restraining the hollow fiber membrane bundle at a region fixed by the potting material. Exemplary hollow fiber membrane filtration modules constructed using curable potting compositions are described in, for example: U.S. Pat. Nos. 8,758,621; 8,518,256; 7,931, 463; 7,022,231; 7,005,100; 6,974,554; 6,648,945; 6,290, 756; and, US2006/0150373. The disclosures of these citations are incorporated herein by reference in their entirety.

It will be recognized that the potting material (3, 48) or the bonding material (38) are used inter alia to seal the overall membrane module and to stabilize the hollow fibers or sheets thereof. Further, the potting or bonding material ensures that the product streams and feed streams do not mix and that any applied pressure or vacuum can be maintained. Consequently, for many applications, any defect in the seal provided by these compositions will be determinative of the operational life of the membrane module.

Traditionally such potting compositions are based on polyurethane and epoxy resins. As regards the former, U.S. Pat. No. 4,227,295 (Bodnar et al.) describes a method of potting the ends of a bundle of hollow fibers disposed in a casing and having utility as in dialyzers for blood. The ends of the bundle of capillary fibers are each sealed in a polyurethane potting compound, with the bores of the capillary fibers communicating through the sealant at each end.

The isocyanates used in such conventional polyurethane compositions present an acknowledged toxicological risk. This relates, on the one hand, to the processing of these coating materials during their use, because the isocyanates normally have a high toxicity and a high allergenic potential (Osha Safety and Health Topics: Isocyanates https://www.osha.gov/SLTC/Isocyanates/). On the other hand, there is the risk that, in flexible substrates, incompletely reacted aromatic isocyanate migrates through the substrate and is there hydrolyzed by moisture or water-containing components to carcinogenic aromatic amines.

In the presence of moisture, curing polyurethane generates carbon dioxide which forms bubbles in the curing material: this foam causes the material to expand as it hardens, weakening the cured material and leading to potential leaks in the finished filter. To obviate this effect, moisture should be eliminated from the potting process but of course the need for climate control and/or drying agents adds complexity and cost to the manufacture of filters.

US 20160145476 (Jordan Jr. et al.) describes a multi-part polyurethane composition suitable for use an adhesive for separatory devices and in particular for potting hollow fibers, said composition comprising: a first part comprising a polyurethane prepolymer composition; and, a second part comprising a desiccant and a polyol having a hydroxyl functionality of 4 to 6. The composition is further characterized by the need for a plasticizer which can be included in one or both parts of the composition.

Potting compositions based on epoxy resins, such as that disclosed in US 20170189860 A1 (Mitsubishi Rayon Co. Ltd) are not so susceptible to moisture. However, epoxy resins generate heat during curing which causes the epoxy to expand as it cures but contract as it cools following the completion of the reaction. The cooling can create stresses and voids in the finished product and promote cracking and other flaws. These effects can be mitigated either by slowing the curing reaction to reduce the amount of generated or by cooling the material as it cures to reduce thermal expansion. Problematically, slowing the process will increase process lead time and reduce manufacturing efficiency, while cooling adds both complexity and cost to the potting operation.

In addition to the above, and as discussed in WO2000/035567 (Millipore Corporation), the application of epoxy resins to multi-layered coiled hollow fiber devices has proved difficult. Conventional means of applying the potting composition using mandrels often does not affect the proper sealing of the epoxy around all of the fibers, especially those fibers positioned at or near the mandrel. Tightly wound, multiple layers of fibers are considered to form a barrier to the epoxy penetrating the inner layers of fibers. And where the fibers do not pot properly, the performance of the module will not match the desired performance outputs.

Certain authors have already recognized that it is desirable to find viable alternatives to using polyurethane and epoxy compositions in membrane modules. For instance, WO2016/054380 (HB Fuller Company) discloses a method for making spiral wound filtration modules with a multi-pack, solvent-free, isocyanate-free (NCO-free) curable adhesive composition. The disclosed adhesive composition is specifically a three component (3K) composition comprising: a) a multi-functional Michael donor; b) a multi-functional Michael acceptor; and, c) a Michael reaction catalyst and in particular a strong base catalyst such as a guanidine or an amidine. The disclosed multifunctional Michael acceptors are selected from the group consisting of: polyhydric alcohols; polyalkylene oxides; polyurethane; polyethylene vinyl acetate; polyvinyl alcohol; polybutadiene and hydrogenated polybutadiene; alkyd and alkyd polyesters; (meth)acrylic polymers; polyolefins; polyesters; halogenated polyolefin; halogenated polyesters; and combinations thereof. The exemplary compositions of this citation are characterized by their use of (meth)acrylate compounds as the Michael acceptors and by the use of 1,8-diazabicyclo[5.4.0]undec-7-ene (DBU) as the basic catalyst, which catalyst must be stored separately from both reacting components.

WO2016/054367 (HB Fuller Company) analogously discloses a method of making hollow fiber filtration modules including potting an end portion of a plurality of hollow fiber membranes with a multi-pack, solvent-free, isocyanate-free (NCO-free) curable composition. The disclosed curable composition is again specifically a three (3K) component composition comprising: a) a multi-functional Michael donor; b) a multi-functional Michael acceptor; and, c) a Michael reaction catalyst and in particular a strong base catalyst such as a guanidine or an amidine. Moreover, the exemplified compositions are identically characterized by the use of toxic DBU which must be stored separately from the (meth)acrylate compounds and the Michael donors of the further components of the composition.

WO 2016/7049281 discloses a separation module including at least one separation leaf that includes two porous composite membranes and a permeate mesh spacer sandwiched therebetween with and an edge-seal bond that adheres the membranes and spacers together.

Based on the established art, the present invention addresses the need for an isocyanate-free potting or bonding composition of which the viscosity can be easily modulated for different filtration applications and which retains an operable curing rate. The need for a moisture-insensitive potting or bonding composition which does not bubble or foam upon mixing and subsequent curing is also addressed.

STATEMENT OF THE INVENTION

In accordance with a first aspect of the invention there is provided a membrane filtration module comprising a housing in which the filtration membrane is disposed in a fixed positional relationship by a potting or bonding material obtained by the curing of a two component (2K) composition consisting of:
  a first component (A) comprising at least one compound (a) having at least two acetoacetate functional groups; and,
  a second component (B) comprising at least one compound (b) having at least one amino group, each said amino group being a primary or secondary amino group.

Generally, to provide an effective potting or bonding composition, the molar equivalence ratio of acetoacetate to amine in the two component (2K) composition should be in the range from 2:1 to 1:2, preferably in the range from 1.2:1 to 0.8:1 and more preferably be 1:1. The presence of a catalyst in the two component (2K) composition is not required.

The or each compound (a) of Component A should desirably be characterized by: a number average molecular weight (Mn) of less than 12000 g/mol, preferably less than 10000 g/mol; and/or, an acetoacetoxy functionality of from 2 to 6, for example from 2 to 4. Independently of or in addition to this characterization, it is preferred that Component A of said composition comprise or consist of at least one acetoacetylated polyol (a), said at least one acetoacetylated polyol being obtainable in accordance with the following equation:

wherein:
  R is a $C_1$-$C_{12}$ alkyl group, preferably a $C_1$-$C_8$ alkyl group;
  L denotes the backbone structure of the polyol; and,
  $q \geq 2$.

The reactant polyol $L(OH)_q$ defined in this equation may be a monomeric polyhydric alcohol. Alternatively, the reactant polyol $L(OH)_q$ may be an oligomeric or polymeric polyhydric alcohol selected from the group consisting of: polyether polyols; polyester polyols; polyesteramide polyols; polycarbonate polyols; polybutadiene polyols; polyurethane polyols; polyacrylate polyols; and, combinations thereof.

The or each compound (b) of component (B) is preferably characterized by: a number average molecular weight of less than 5000 g/mol, preferably less than 2000 g/mol; and, from 1 to 10, preferably from 2 to 6 amino groups, wherein each said amino group is a primary or secondary amino group.

In an embodiment, component (B) preferably comprises at least one polyoxyalkylene amine based on adducts of polyoxypropylene, polyoxyethylene and poly(oxyethylene) poly(oxypropylene) and having 2 or 3 amino groups, each said amino group being either a primary or a secondary amino group. In a further, but not necessarily mutually exclusive embodiment, component (B) of said composition comprises or consists of at least one reactant amine in accordance with Formula (III):

$R^2R^3NH$            Formula (III)

wherein:
  $R^2$ is hydrogen or a $C_1$-$C_6$ alkyl group; and,
  $R^3$ is a hydrocarbyl group having up to 36 carbon atoms which contains aromatic groups, which hydrocarbyl group is optionally substituted by one or more —$NHR^2$ groups and is further optionally interrupted by one or more O atoms and/or by one or more —$N(R^4)$— groups of which $R^4$ is a hydrogen atom; or,
  $R^3$ is a $C_1$-$C_{36}$ aliphatic group which is optionally substituted by one or more —$NHR^2$ groups and which is further optionally interrupted by one or more O atoms and/or by one or more —N(R⁴)— groups of which R⁴ is a hydrogen atom; and, R² and R³ may form a ring together with the N-atom to which they are bound.

The second aspect of the present invention is defined as the use of a two component (2K) curable composition in the potting or bonding of at least one membrane within the housing of a filtration module, said two component (2K) curable composition consisting of:
  a first component (A) comprising at least one compound
    (a) having at least two acetoacetate functional groups; and,
  a second component (B) comprising at least one compound (b) having at least one amino group, each said amino group being a primary or secondary amino group.

In accordance with a third aspect of the present invention, there is provided a method of making a hollow fiber membrane module, said method comprising:
  i) preparing a curable composition by mixing component (A) and component (B) of a two component (2K) composition, said composition being characterized in that it consists of:
    a first component (A) comprising at least one compound (a) having at least two acetoacetate functional groups; and,
    a second component (B) comprising at least one compound (b) having at least one amino group, each said amino group being a primary or secondary amino group;
  ii) applying the mixture obtained in step i) onto at least one end portion of a plurality of hollow fiber membranes; and
  iii) allowing the curable composition to solidify and cure, thereby potting said at least one end portion of the plurality of hollow fiber membranes.

In accordance with a third aspect of the present invention, there is provided a method of making a spiral wound filtration module, said spiral wound filtration module comprising a permeate collection tube (34) and one or more membrane leaf packet(s) wound about said collection tube, each membrane leaf packet having first and second membrane sheets (31) in between which sheets is disposed a permeate spacer (33) and wherein each said membrane sheet (31) has a membrane side and a backing side, the method comprising:
  i) preparing a curable composition by mixing component (A) and component (B) of a two component (2K) composition, said composition being characterized in that it consists of:
    a first component (A) comprising at least one compound (a) having at least two acetoacetate functional groups; and,
    a second component (B) comprising at least one compound (b) having at least one amino group, each said amino group being a primary or secondary amino group;
  ii) applying the mixture obtained in step i) onto at least a portion of the backing side of the first membrane leaf;
  iii) winding the membrane leaf packet(s) around the permeate collection tube (34); and,
  iv) allowing the curable composition to solidify and cure, thereby bonding the backing side of the second membrane leaf to the backing side of the first membrane leaf.

Definitions

As used herein, the singular forms "a", "an" and "the" include plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or method steps.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The terms "preferred", "preferably", "desirably", "in particular" and "particularly" are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

The molecular weights given in the present text refer to number average molecular weights (Mn), unless otherwise stipulated. All molecular weight data refer to values obtained by gel permeation chromatography (GPC), unless otherwise stipulated.

The glass transition temperature (Tg) of copolymers can be calculated from the monomeric composition of the copolymer. If the copolymer is homogeneous and prepared via a statistical co-polymerisation process, then the Tg can be calculated from the Tg values of all corresponding homopolymers, according to the Fox equation:

$$\frac{1}{Tg_m} = \frac{w_1}{Tg_1} + \frac{w_2}{Tg_2} + \frac{w_3}{Tg_3} + \ldots$$

wherein:
  $Tg_m$: the Tg of the copolymer (in Kelvin);
  $Tg_1$: the Tg of the homopolymer of comonomer 1 (in Kelvin);
  $Tg_2$: the Tg of the homopolymer of comonomer 2; and
  $w_1$: the weight fraction of comonomer 1 in the copolymer; etc.

The actual glass transition temperature (Tg) of a copolymer and of any other resin herein can be determined by differential scanning calorimetry (DSC). The use of DSC to determine Tg is well known in the art, and is described by B. Cassel and M. P. DiVito in "*Use of DSC To Obtain Accurate Thermodynamic and Kinetic Data*", American Laboratory, January 1994, pp 14-19, and by B. Wunderlich in *Thermal Analysis*, Academic Press, Inc., 1990.

Unless otherwise stated, OH values given herein were obtained following *Deutsche (DGF) Einheitsmethoden zur Untersuchung von Fetten, Fettprodukten, Tensiden and verwandten Stoffen* (Gesamtinhaltsverzeichnis 2016) CA/17b (53).

The amine values given herein are determined by titration with 0.1 N hydrochloric acid in accordance with ASTM D2572-91 and thereafter calculated back to mg KOH.

"Gel time" is used herein in accordance with its standard definition as the time it takes for a mixed curable composition to gel or become so highly viscous that it can no longer be considered workable or able to be handled.

As used herein, room temperature is 23° C. plus or minus 2° C.

As used herein, the term "potting or bonding material" is intended to include materials that can be used to hold a filtration membrane, such a spiral wound membrane or hollow fiber membrane in a fixed positional relationship. For example, the potting material will hold hollow fibers in a fixed positional relationship with one another, where applicable. The potting or bonding material may also serve to direct feed, filtrate, concentrate and retentate flow in, around and through the membrane.

As used herein, the term "two-component composition" refers to a composition consisting of two components that are stored in separate containers because of their mutual reactivity. The two components are generally not mixed until shortly before application of the composition to a substrate. When the two separate components are mixed and applied, the mutually reactive compounds in the two components react to crosslink and form, for instance, a matrix or a cured film on a substrate.

The term "polyol" as used herein shall include diols and higher functionality hydroxyl compounds.

The term "hydrocarbyl group" is used herein in its ordinary sense, which is well-known to those skilled in the art.

As used herein, the term "aliphatic group" refers to a non-aromatic residue that contains predominantly carbon and hydrogen atoms. As such, a $C_1$ to $C_{36}$ aliphatic hydrocarbyl residue contains from 1 to 36 carbons atoms. The residue may be straight chain, cyclic, bicyclic, branched, saturated or unsaturated. It may also contain combinations of straight chain, cyclic, bicyclic, branched, saturated or unsaturated moieties. The term encompasses alkyl, alkenyl, and alkynyl groups, for example. In addition, when so stated, the aliphatic group residue may contain heteroatoms within the backbone thereof.

As used herein; "aromatic" refers to a major group of unsaturated cyclic hydrocarbons containing one or more rings. The term is intended to encompass both aryl and heteroaryl groups, for example $C_6$ to $C_{10}$ aryl groups.

As used herein, the term "$C_6$ to $C_{10}$ aryl group" refers to an aromatic monocyclic or multicyclic ring system of 6 to 10 carbon atoms. The "aryl group" may optionally be substituted with one or more $C_1$-$C_{12}$ alkyl, alkylene, alkoxy, or haloalkyl groups. Exemplary aryl groups include phenyl or naphthyl, or substituted phenyl or substituted naphthyl.

Unless otherwise indicated, the term "alkyl", as used herein, includes straight chain moieties, and where the number of carbon atoms suffices, branched moieties. As such, the term "$C_1$-$C_{12}$ alkyl" includes both saturated straight chain and branched alkyl groups having from 1 to 12 carbon atoms. Analogously the term "$C_1$-$C_6$ alkyl" includes saturated straight chain and branched alkyl groups having from 1 to 6 carbon atoms. Examples of $C_1$-$C_6$ alkyl groups include methyl, ethyl, propyl, isopropyl, butyl, isobutyl, tert-butyl, pentyl and hexyl groups.

The term "$C_3$-$C_6$ cycloalkyl" as used herein means a saturated cyclic hydrocarbon having 3-6 carbon atoms, i.e. cyclopropyl, cyclobutyl, cyclopentyl or cyclohexyl.

The term "alkoxy", as used herein, means "—O-alkyl" or "alkyl-O—", wherein "alkyl" is defined as above.

As used herein, the term "interrupted by one or more" of a stated heteroatom means that the or each heteroatom may be positioned at any position along the hydrocarbyl chain including at either end of the chain.

For completeness: a) a primary amine group is an atomic grouping of the type "—$NH_2$"; (b) a secondary amine group is an atomic grouping of the type "—NHR"; and, c) a tertiary amine group is an atomic grouping of the type "—$NR_2$", with R not being hydrogen. An amino-functional polymer means a polymer possessing at least one amine group.

As used herein, the term "catalytic amount" means a sub-stoichiometric amount of catalyst relative to a reactant.

As used herein, the qualification "solvent free" is intended to indicate that no solvent or water is present in the stated composition before curing except for trace amounts which may be present as impurities. Conventionally such impurities are less than 1 wt. %, preferably less than 0.5 wt. % and more preferably less than 0.01 wt. %, based on the total weight of potting or bonding composition.

DETAILED DESCRIPTION OF THE INVENTION

Component A.

As stated above, Component A comprises at least one compound (a) having at least two acetoacetoxy groups. As such, this component may comprise either a single compound having at least two acetoacetoxy groups or a mixture of two or more compounds each having at least two acetoacetoxy groups. Each said compound (a) of Component A should desirably be characterized by: a number average molecular weight (Mn) of less than 12000 g/mol, for example less than 10000 g/mol or less than 6000 g/mol; and/or, an acetoacetoxy functionality of from 2 to 6, for example from 2 to 4.

In a preferred embodiment, Component A comprises or consists of at least one acetoacetylated polyol, said acetoacetylated polyol being obtainable in accordance with the following equation (Reaction 1):

wherein:
R is a $C_1$-$C_{12}$ alkyl group;
L denotes the backbone structure of the polyol; and,
q≥2.

Reaction 1 above may be described as the transesterification—or more specifically the transacetylation—of a polyol with an acetoacetate compound as defined in Formula (I) below:

Formula (I)

wherein R is said $C_1$-$C_{12}$ alkyl group. More typically, the constituent alkyl group R has from 1 to 8 and, preferably, from 1 to 6 carbon atoms. Exemplary alkyl acetoacetates include: t-butyl acetoacetate; isobutyl acetoacetate; n-butyl acetoacetate; isopropyl acetoacetate; n-propyl acetoacetate; ethyl acetoacetate; and, methyl acetoacetate. t-Butyl acetoacetate is preferred herein.

The polyol of Reaction 1 above is denoted by Formula (II) herein below:

$$L\text{-}(OH)_q \quad \text{Formula (II)}$$

wherein q≥2 and L denotes the backbone structure. Such polyols (II) may optionally include heteroatoms in their backbone or in pendent side chains. Further, the polyol (II) may be a monomeric polyhydric alcohol or may possess an oligomeric or polymeric backbone. Irrespective of this, it is preferred that the polyol (II) has a number average molecular weight (Mn) of less than 12000 g/mol; and, an hydroxyl functionality, q, of from 2 to 6, preferably from 2 to 4.

In a first embodiment, Component A comprises an acetoacetylated polyol obtained from a monomeric polyhydric alcohol. Examples of suitable monomeric polyhydric alcohols include but are not limited to: 1,2-butanediol; 1,3-butanediol; 1,4-butanediol; 2,3-butanediol; 2,4-pentanediol; butyl ethyl propane diol (BEPD); 1,4-hexanediol; 1,4-cyclohexane dimethanol; pentaerythritol; dipentaerythritol; trimethylolethane; trimethylolpropane; ditrimethylolpropane; tricyclodecane dimethanol; hydroquinone bis(2-hydroxyethyl) ether; alkylene glycols, such as ethylene glycol, diethylene glycol, propylene glycol, dipropylene glycol, butylene glycol, pentamethylene glycol, hexamethylene glycol, hexylene glycol and neopentyl glycol; glycerol; castor oil; castor wax; sugars such as glucose, sucrose, fructose, raffinose, maltodextrose, galactose, xylose, maltose, lactose, mannose and erythrose; sugar alcohols such as erythritol, xylitol, malitol, mannitol, isosorbide and sorbitol; and, hydroxyalkylated aliphatic diamines such as o,o'-bis(diethanolaminomethyl)-p-nonylphenol, N,N,N,N'-tetra(2-hydroxypropyl)ethylenediamine (Quadrol L, available from BASF) and N,N,N,N-tetra(2-hydroxyethyl)ethylenediamine. A commercial example of an acetoacetylated polyol obtained from a monomeric polyhydric alcohol is Lonzamon AATMP.

The present invention also does not preclude component A from comprising an acetoacetylated polyol obtained from an oligomeric or polymeric polyhydric alcohol. In particular, the polyol (II) may be selected from the group consisting of: polyoxyalkylene polyols, also called polyether polyols; polyester polyols, including polycaprolactone polyols; polyesteramide polyols; polycarbonate polyols; polybutadiene polyols; polyurethane polyols; polyacrylate polyols; and, combinations thereof. Desirably such oligomeric or polymeric polyols should be characterized by: a number average molecular weight (Mn) of at most 10000 g/mol and preferably from 250 to 6000 g/mol. Further, the use of one or more polyether polyols or polyester polyols as the starting material is of particular interest. And a commercial example of a polyether polyol is Voranol CP260 (available from DowDuPont).

As is known in the art, polyester polyols can be prepared from condensation reactions of polybasic carboxylic acids or anhydrides and a stoichiometric excess of polyhydric alcohols, or from a mixture of polybasic carboxylic acids, monobasic carboxylic acids and polyhydric alcohols. Suitable polybasic carboxylic acids and anhydrides for use in preparing the polyester polyols include those having from 2 to 18 carbon atoms and in particular those having from 2 to 10 carbon atoms. Non-limiting examples of such polybasic carboxylic acids and anhydrides include: adipic acid; glutaric acid; succinic acid; malonic acid; pimelic acid; sebacic acid; suberic acid; azelaic acid; 1,4-cyclohexane dicarboxylic acid; phthalic acid; phthalic anhydride; isophthalic acid; terephthalic acid; tetrahydrophthalic acid; hexahydrophthalic acid; and, combinations thereof. Monobasic carboxylic acids which can be used include those having from 1 to 18 carbon atoms or, preferably from 1 to 10 carbon atoms, of which the following examples might be mentioned: formic acid; acetic acid; propionic acid; butyric acid; valeric acid; caproic acid; caprylic acid; capric acid; lauric acid; myristic acid; palmitic acid; stearic acid; and, combinations thereof. Suitable polyhydric alcohols have from 2 to 18 carbon atoms and desirably from 2 to 10 carbon atoms. Exemplary polyhydric alcohols include, but are not limited to: ethylene glycol; propylene glycol; hexene-1,6-diol; trimethylol propane; glycerol; neopentyl glycol; pentaerythritol; butylene glycol; 2-methyl-1,3-propane diol; hexylene glycol; and, combinations thereof.

Polyether polyols may be produced by processes known in the art, such as the reaction of alkene oxides with polyhydric starter molecule in the presence of an appropriate catalyst, such as an alkali metal hydroxide, alkali metal alkoxide or antimony pentachloride. Examples of the alkene oxides include: tetrahydrofuran; ethylene oxide; 1,2-propylene oxide; 1,2- and 2,3-butylene oxide; and, styrene oxide. And examples of suitable starter molecules include but are not limited to: water; ethylene glycol; 1,2- and 1,3-propanediols; 1,4-butanediol; diethylene glycol; and, trimethylolpropane. Preferred polyether polyols for use herein are: poly(propylene oxide) polyol; poly(ethylene oxide) polyol; PTMEG; and, mixtures thereof.

Polycarbonate polyols for use herein can be selected from but are not limited to polycarbonate diols. Such polycarbonate diols may be produced by the reaction of a diol with dialkyl or diaryl carbonates or phosgene. The reactant diols may be selected from but are not limited to: 1,2-propanediol; 1,3-propanediol; 1,4-butanediol; 1,5-pentanediol; 1,6-hexanediol; diethylene glycol; trioxyethylene glycol; and, mixtures thereof. An exemplary diaryl carbonate is diphenyl carbonate.

The transesterification (transacetylation) Reaction 1 may be conducted by conventional methods as known in the art of polymer chemistry. Reference in this regard may be made to inter alia: Witzman et al. "*Comparison of Methods for the Preparation of Acetoacetylated Coating Resins*", Journal of Coatings Technology, Vol. 62, No. 789, October 1990; and, Witzeman et al. "*Transacetoacetylation with tert-butyl acetoacetate: Synthetic Applications*", J. Org. Chemistry 1991, 56, 1713-1718. Typically, the reaction between the oligomeric or polymeric polyol and the acetoacetate will involve mixing said polyol and acetoacetate in a suitable vessel, either with or without solvent, at an elevated temperature of, for example, from 50° to 200° C. or from 80° to 150° C.; preferably, the reaction is performed in the absence of solvent. The reaction is driven towards completion by distilling off the alcohol (R—OH) formed under reduced pressure. Moreover, the reaction is preferably conducted in the presence of a catalytic amount of a transesterification catalyst of which suitable examples include, but are not limited to, calcium acetate, zinc acetate, bismuth acetate, lead oxide and trichloroacetic acid.

The reaction should proceed to at least 99% conversion of the hydroxyl groups into acetoacetoxy functional groups: this degree of conversion can be monitored and confirmed by infrared spectroscopy. Whilst the reactants may be used in amounts such that one OH group is present for each acetoacetoxy group, it is also preferred to use a molar excess of the acetoacetate to ensure complete reaction.

Whilst the product of the above described transacetylation reaction may be used directly in Component (A) of the present potting or bonding composition, that reaction product may equally be first isolated and purified using methods known in the art. Mention in this regard may be made of extraction, evaporation, distillation and chromatography as suitable techniques.

Component B

The second component (B) of the composition of the present invention comprises at least one nitrogen-containing compound (b) having at least one carbonyl group-reactive amine nitrogen atom. Such compounds may be aliphatic, cycloaliphatic or aromatic, polymeric or non-polymeric, and may be used alone or in combination. Further said nitrogen containing compound may be a primary amine, a secondary amine or a primary/secondary amine.

Desirably, component (B) comprises at least one nitrogen-containing compound (b) having a number average molecular weight of less than 10000 g/mol, in particular less than 5000 g/mol, for example less than 2000 g/mol or less than 1000 g/mol, and having from 1 to 10, for example from 2 to 6 primary and/or secondary amino groups. Applying this definition, component (B) may contain one or more polyfunctional amines based on adducts of oligomers of $C_1$ to $C_8$ or, desirably, $C_2$ to $C_4$ alkylene oxides. More preferably, component (B) may contain at least one polyoxyalkylene amine based on adducts of polyoxypropylene, polyoxyethylene and poly(oxyethylene)poly(oxypropylene) and having from 2 to 6, for example 2 or 3 amino groups, each said amino group being a primary or a secondary amino group: commercial examples of such amine terminated polyoxyalkylenes include the "JEFFAMINE" series of "D", "ED", "T" and "XTJ" available from Huntsman Chemical Corporation, Salt Lake City, Utah, of which Jeffamine D230 and D400 are of particular interest.

In a further, but not mutually exclusive embodiment, component (B) comprises at least one reactant amine and having from 1 to 10, for example from 2 to 6 or from 2 to 4 primary and/or secondary amino groups in accordance with Formula (III) herein below:

Formula (III)

wherein:
  $R^2$ is hydrogen or a $C_1$-$C_6$ alkyl group; and,
  $R^3$ is a hydrocarbyl group having up to 36 carbon atoms which contains aromatic groups, which hydrocarbyl group is optionally substituted by one or more —$NHR^2$ groups and is further optionally interrupted by one or more O atoms and/or by one or more —$N(R^4)$— groups of which $R^4$ is a hydrogen atom; or,
  $R^3$ is a $C_1$-$C_{36}$ aliphatic group which is optionally substituted by one or more —$NHR^2$ groups and which is further optionally interrupted by one or more O atoms and/or by one or more —$N(R^4)$— groups of which $R^4$ is a hydrogen atom; and,
  $R^2$ and $R^3$ may form a ring together with the N-atom to which they are bound.

For completeness, where $R^2$ and $R^3$ form a ring, it will be recognized that such a ring may be heterocyclic in that it may include one or more nitrogen atoms.

Good results have also been obtained wherein the reactant amine according to Formula (III) is characterized in that: $R^2$ is hydrogen; and, $R^3$ is a $C_1$ to $C_{36}$ alkyl group preferably a $C_1$ to $C_{12}$ alkyl group which is optionally substituted with at least one —$NHR^2$ group and which is optionally interrupted by one or more —$N(R^4)$— groups of which $R^4$ is a hydrogen atom. Exemplary di-primary amines of this embodiment include: tetramethylene diamine; pentamethylene diamine; hexamethylene diamine; octamethylene diamine; and, dodecamethylene diamine. Exemplary primary-secondary diamines of this embodiment include: N-methylethylenediamine; N-ethylethylenediamine; N-methyl-1,3-diaminopropane; 2-(isopropylamino)ethylamine; N-propylethylenediamine; N-propyl-1,3-propanediamine; N-cyclohexyl-1,3-propanediamine; 4-(aminomethyl)piperidine; 3-(aminomethyl)piperidine; 2-(aminomethyl)piperidine; and, 4-am inopiperidine.

Further exemplary commercial amines for use in the present invention include but are not limited to: 2-methyl-1,5-diaminopentane available as Dytek A from Invista Arpadis; 1,2-diaminocyclohexane, available as a mixture of isomers as Dytek DCH-99 from Invista Arpadis; N,N'-dimethyl hexanediamine (MAHMA) available from Sigma-Aldrich; fatty acid dimer based diamines available as Priamine 1071, 1073, 1074 and 1075 from Croda; phenalkamines available as Cardolite NX-5608, NX-5607 and LITE 3060 available from Cardolite Corporation; and, polyethyleneimines (PEI) available under the trade names Lupasol G 20 (waterfree) and Lupasol FG from BASF.

And still further exemplary amines suitable for use in component (B) of the present invention include: piperidine; pyrolidine; and, N,N'-dimethyl-1,6-hexanediamine.

In certain circumstances it may be beneficial for reactant amines to include a primary amine according to Formula (III) which is characterized in that $R^2$ is hydrogen and $R^3$ is a $C_1$ to $C_{12}$ alkyl group, preferably a $C_1$ to $C_6$ alkyl group. Exemplary amines of this type include: n-butylamine; n-hexylamine; n-octylamine; n-decylamine; and, n-dodecylamine.

It is noted that the composition of the present invention can comprise a large excess of either said amine or said acetoacetate: the composition may, for example, be broadly characterized by a molar equivalence ratio of acetoacetate to amine of from 1:10 to 10:1. However, the amount of amine in component (B) of the present composition is generally selected such that the molar equivalence ratio of acetoacetate to amine may be in the range from 2:1 to 1:2, for example from 1.2:1 to 0.8:1. Thus, while it is preferred that one mole of amine be available for every acetoacetate equivalent in the composition, variances about this preferred 1:1 equivalence ratio can be tolerated.

An advantage of the chemistry of the present potting and bonding composition is that its rate of curing can be tuned or moderated to control the rate of development of the mechanical properties of the cured material. For example, a fact curing reaction and concomitant fast development of those mechanical properties can be advantageous in potting applications for hollow fiber membranes.

Adjunct and Additive Ingredients of the Composition

To form the potting or bonding composition, the reactive components (A) and (B) are brought together and mixed in such a manner as to induce the hardening thereof. More particularly, the components (A) and (B) may be mixed in pre-determined amounts by hand, by machine, by (co-) extrusion or by any other means which can ensure fine and highly homogeneous mixing thereof. Upon initial mixing— "initial" meaning herein up to 1 minute after components (A) and (B) are combined—the potting or bonding composition is a liquid at room temperature. This fact does not however preclude the mixing temperature being above room temperature, for example up to 15° C. above room temperature.

The potting or bonding composition may, of course, contain adjunct ingredients and additives. However, two (2K) component compositions should broadly be formulated to exhibit an initial viscosity of less than 200000 mPa·s. For example, compositions used for potting in hollow fiber membrane filtration modules may be characterized by an initial viscosity of less than 10000 mPa·s, preferably less than 5000 mPa·s and more preferably less than 2500 mPa·s at 25° C. Compositions used for bonding spiral wound membrane filtration modules may be characterized by an initial viscosity of less than 30000 mPa·s, preferably less than 15000 mPa·s and more preferably less than 7500 mPa·s at 25° C. In a particular preferred embodiment, the potting or bonding composition according to the present invention is characterized by an initial viscosity of less than 30000 mPa·s, preferably less than 20000 mPa·s and more preferably less than 1500 mPa·s.

Independently of or additional to said viscosity characteristics, the two (2K) component composition should be formulated to be bubble (foam) free upon mixing and subsequent curing. Moreover, the potting or bonding composition should further be formulated to demonstrate at least one, desirably at least two and most desirably all of the following properties: i) a gel time of from 5 to 120 minutes, for example from 5 to 30 minutes after the combination of the two parts of the composition; ii) a maximum exotherm temperature of no greater than 120° C., preferably no greater than 100° C. and more preferably no greater than 80° C.; and, iii) a Shore A hardness of at least 50, preferably at 60 and more preferably at least 70 after being cured and stored for 7 days at room temperature and 50% relative humidity. In a particular preferred embodiment, the inventive potting or bonding composition has a gel time of 3 t 120 minutes after the combination of the two parts of the composition.

The composition of the present invention may be solvent-free. In the alternative, the composition may comprise one or more solvents, of which at least one said solvent is preferably miscible with water. It is therefore envisaged that the composition may be characterized by a solvent system consisting of two or more solvents that are miscible with water. Equally, the composition may be characterized by a solvent system consisting of at least one solvent that is immiscible with water and at least one solvent that is miscible with water. For completeness, the term "immiscible" as used herein means that in some proportion two phases are present.

Non-limiting examples of solvents miscible with water include, without limit, acetic acid, acetone, acetonitrile, dimethylformamide, dimethyl sulfoxide, dioxane, ethanol, methanol, n-propanol, isopropanol, and tetrahydrofuran. Non-limiting examples of solvents that are immiscible with water include benzene, n-butanol, butyl acetate, carbon tetrachloride, chloroform, cyclohexane, 1,2-dichloroethane, dichloromethane, ethyl acetate, di-ethyl ether, heptane, hexane, methyl-1-butyl ether, methyl ethyl ketone, pentane, di-isopropyl ether, toluene, trichloromethane, xylene, and combinations thereof.

When used, the amount of solvent present in the composition may be determined based on normal practical considerations. In general, however, the volume to mass ratio of the solvent to the acetoacetate functionalized compound(s) will be in the range from 1:1 to 100:1. In some embodiments, the volume to mass ratio of the solvent to the acetoacetate functionalized compound(s) may be in range from 1:1 to 50:1.

The compositions of the present invention may, of course, also contain standard additives such as pigments, fillers, plasticizers, levelling agents, foam suppressing agents, rheology control agents, catalysts, anti-oxidants, tackifiers, and, UV-stabilizers. The choice of appropriate additives is limited only in that these must be compatible with the other components of the composition and cannot be deleterious to the use of the composition in potting or bonding applications. The additives may be disposed in either part ((A) or (B)) of the two component composition.

When fillers are employed, they should typically be included in an amount of up to 75% by weight, for example up to 50 wt. % or up to 30 wt. %, based on the weight of the composition. Suitable for use as fillers herein are, for example, chalk, lime powder, precipitated and/or pyrogenic silicic acid, zeolites, bentonites, magnesium carbonate, diatomite, alumina, clay, talc, titanium oxide, iron oxide, zinc oxide, sand, quartz, flint, mica, glass powder, and other ground mineral substances. Organic fillers can also be used, in particular carbon black, graphite, wood fibers, wood flour, sawdust, cellulose, cotton, pulp, cotton, wood chips, chopped straw, chaff, ground walnut shells, and other chopped fibers. Short fibers such as glass fibers, glass filament, polyacrylonitrile, carbon fibers, Kevlar fibers, or polyethylene fibers can also be added. Aluminum powder is likewise suitable as a filler. Also, core shell particles present suitable fillers which may be used in the inventive composition. It was surprisingly found that the addition of fillers in the claimed range helps to avoid bead spread, which is of particular importance in spiral wound membrane applications.

In certain embodiments, plasticizers may be included to moderate the softness and flexibility of the cured potting or bonding composition. One or more plasticizers may in this case be selected from the group consisting of: vegetable oil; mineral oil; soybean oil; terpene resins; aromatic esters such as dioctyl phthalate, diundecyl phthalate, tricresyl phosphate and triisononyl mellitate; linear esters such as di-tridecyl adipate; chlorinated Paraffin; aromatic and napthenic process oils; alkyl naphthalenes; and, low molecular weight polyisoprene, polybutadiene, or polybutylene resins. Conventionally, the amount of plasticizer should be from 0 to 20 wt. %, preferably from 0 to 10 wt. % or from 0 to 5 wt. % based on the total weight of the potting composition.

The reaction of component (A) and component (B) can be catalyzed and this may be effective where component (B) comprises an aromatic amine. Known catalysts include, for instance, stannous octoate, stannous dioleate, stannous palmitate, stannous oxalate, boron trifluoride etherate and organic acids having pKa values of from 0.1 to 0.8. a suitable organic acid to be used as catalyst is, for example, para-toluene sulfonic acid. And, where used, the amount of catalyst—as determined in the absence of any applicable support—should be from 0.001 to 5 wt. %, preferably from 0.01 to 2 wt. % by weight, based on the total weight of reactant amine used. However, it is highly preferred that the present composition be free of catalysts.

Methods and Applications

As described above, there is no particular intention to limit the type of filtration membrane module to which the above described potting or bonding composition is to be applied. As such, the person of ordinary skill in the art will be able to select the most appropriate method and loci for the application of the composition within the modules. That said, but without intention to limit the present invention, it will be recognized that static potting and centrifugal potting of membranes in a mold are two common and valuable techniques for said application. In a static potting technique, the potting composition is introduced into a membrane potting mold while the mold is substantially stationary. In centrifugal potting methods, the potting composition is introduced into a membrane potting mold while the mold is being rotated such that the rotation of the mold forces the potting material towards an end of the rotating mold by centrifugal force.

The above aside, central to any method of application is that the potting or bonding composition is sufficiently fluid upon application for it to penetrate the desired layers of laminae (flat sheets) or fibrous bundles and then set to seal the outer surfaces of the laminae or the fibers in the bundle to form a fluid tight seal. Useful application temperatures will typically range from 10° C. to 50° C. or from 20° C. to 35° C. with lower temperatures being preferred as they may extend the working life of the curable composition.

The pre-treatment of the membranes, for example of the hollow fibers or of laminae, prior to the step of applying the potting or bonding composition is certainly not precluded. It can, for instance, be advantageous to treat these bodies with a removable wetting agent that is compatible with both the membrane and the applied composition. Such wetting agents can insure the pot is reproducible and can eliminate issues of meniscus formation and the blocking of otherwise active pores of the membranes upon application of the composition. Reference in regard to such pre-treatment may be made inter alia to: U.S. Pat. No. 4,389,363 (Molthop).

The curing of the potting or bonding compositions of the invention typically occurs at temperatures in the range of from −10° C. to 120° C., preferably from 0° C. to 70° C., and in particular from 20° C. to 60° C. The temperature that is suitable depends on the specific compounds present and the desired curing rate and can be determined in the individual case by the skilled artisan, using simple preliminary tests if necessary. Of course, curing at temperatures of from 10° C. to 35° C. or from 20° C. to 30° C. is especially advantageous as it obviates the requirement to substantially heat or cool the mixture from the usually prevailing ambient temperature. Where applicable, however, the temperature of the mixture formed from components (A) and (B) may be raised above the mixing temperature and/or the application temperature using conventional means: in the preparation of hollow fiber membranes and spiral would membranes it is expedient to use microwave induction for this purpose.

A further object of the present invention is a method for making a hollow fiber membrane module, said method comprising:
  i) preparing a curable composition by mixing component (A) and component (B) of a two component (2K) composition, said composition being characterized in that it consists of:
    a first component (A) comprising at least one compound (a) having at least two acetoacetate functional groups; and,
    a second component (B) comprising at least one compound (b) having at least one amino group, each said amino group being a primary or secondary amino group;
  ii) applying the mixture obtained in step i) onto at least one end portion of a plurality of hollow fiber membranes; and.
  iii) allowing the curable composition to solidify and cure, thereby potting said at least one end portion of the plurality of hollow fiber membranes.

A spiral wound filtration module may be assembled by wrapping one or more membrane leaf packet(s) and feed spacer sheets about a central permeate collection tube. Each leaf packet includes two generally rectangular membrane sheets surrounding a permeate carrier sheet. This "sandwich" structure is held together by a bonding adhesive along three edges of each membrane sheet: the back edge farthest from the permeate tube, and the two side edges that will become the feed (inlet) and concentrate (outlet) ends of the module. The bonding adhesive at the two side edges additionally affix and seal membrane sheets to the permeate collection tube at each end of the module. The fourth edge (i.e., the fold edge) of the membrane sheets is open and abuts the permeate collection tube so that the permeate carrier sheet is in fluid contact with small holes on the permeate collection tube and the fluid is passing through the permeate collection tube.

Alternatively, the process herein described may be repeated a number of times so that it is possible to make a multi-layered leaf packets that consist of more than two bonded leaf packets. For example, a third leaf packet could be bonded to the second leaf packet by repeating the aforementioned process, so that a plurality of leaf packets is assembled together prior to the winding step to form the module.

The inventive composition allows relative movement of various membrane sheets during the winding process. That is, the cure rate or period of gel time is longer than that required to assemble and wind one or more membrane leaf packet(s) about the permeate collection tube to produce a filtration module.

A further object of the present invention is therefore a method for making a spiral wound filtration module, said spiral wound filtration module comprising a permeate collection tube (34) and one or more membrane leaf packet(s) wound about said collection tube, each membrane leaf packet having first and second membrane sheets (31) in between which sheets is disposed a permeate spacer (33) and wherein each said membrane sheet (31) has a membrane side and a backing side, the method comprising:
  i) preparing a curable composition by mixing component (A) and component (B) of a two component (2K) composition, said composition being characterized in that it consists of:
    a first component (A) comprising at least one compound (a) having at least two acetoacetate functional groups; and,
    a second component (B) comprising at least one compound (b) having at least one amino group, each said amino group being a primary or secondary amino group;
  ii) applying the mixture obtained in step i) onto at least a portion of the backing side of the first membrane leaf;
  iii) winding the membrane leaf packet(s) around the permeate collection tube (34); and,
  iv) allowing the curable composition to solidify and cure, thereby bonding the backing side of the second membrane leaf to the backing side of the first membrane leaf.

Various features and embodiments of the disclosure are described in the following examples, which are intended to be representative and not limiting.

EXAMPLES

The following Test Methods were employed in the Examples:
i) Viscosity:
  The initial viscosity of the freshly mixed two (2) component composition was calculated based on the viscosities of the contained pure substances and their content ratios. Experimentally, the viscosity upon mixing was recorded using either a Brookfield DV-II+ Pro (Spindle 7) at 25° C.

or a Haake Mars Modular Advance Rheometer System, (parallel plate rheometer, available from Thermo Scientific) at 80° C. In the latter case, the viscosity value could be recorded up to approximately 3 minutes after mixing. Consequently, the experimental values exceed the calculated ones significantly.

ii) Gel Time:

a) Gel times were determined by using a Brookfield DV-II+ Pro (Spindle 7) at 25° C. Formulations (12 g) were hand mixed in the ratio according to Table 1 herein below and quickly poured into an aluminium vessel. The gel time was defined as the elapsed time after mixing when a viscosity level of 100 Pa·s was attained.

b) In addition, gel times were determined on the above-mentioned parallel plate rheometer at 80° C. A freshly hand-mixed formulation (ca. 500 mg) was applied to the bottom plate and the measurement started as soon as possible and conventionally within 3 minutes after mixing. The gel time was defined as the elapsed time after mixing when the viscosity reached a value of 2000 Pas.

iii) Shore Hardness:

A sample disk was prepared by combining the two components of the composition (A, B: Table 1) at room temperature in a polypropylene (PP) vial and further homogenizing the mixture in a planetary mixer (Speed Mixer: 800 rpm; 30 seconds; ambient pressure). The vial was then stored at 50° C. for 12 minutes and then stored further under room temperature and pressure thereby mimicking the curing conditions of a typical hollow fibre filter production process.

The Shore hardness was determined by pressing a hand held durometer—Zwick 3130 for Shore A hardness and Zwick 3131 for Shore D hardness—onto the sample (≥6 mm thickness; 3 seconds contact time before measurement) in accordance with DIN ISO 7619-1. The hardness was recorded after the initial curing (12 minutes at 50° C.) and further monitored every 30 minutes upon storage under room temperature and pressure, until Shore 75 A was attained. (Shore 75 A is deemed indicative of a hardness value which allows for good cuts in hollow fibre filter processes). Another data point (Final Hardness) was recorded after 7 days of storage at room temperature.

iv) Sterilization Resistance:

Fully cured sample disks of ca. 25 g weight were incubated in a steam sterilizer (DX-65 from Systec GmbH) at 121° C. for 15 min, after which the samples were allowed to cool to room temperature. The Shore hardnesses of the samples were then recorded. The sterilization test was deemed to be passed when the Shore hardness did not drop by more than 10 Shore A units following the treatment.

v) Shrinkage:

For the Examples according to the present invention, a sample disk of ca. 10 g weight was prepared by combining the two components of the composition (A, B: Table 1) at room temperature in a polypropylene (PP) vial and further homogenizing the mixture in a planetary mixer (Speed Mixer: 800 rpm; 30 seconds; ambient pressure). The vial was stored at 50° C. for at least 4 days, after which typically the final hardness was reached. At that time, shrinkage was determined by density measurements based on a buoyancy method applying Archimedes principle.

The commercial polyurethane composition (Comparative Example 1) was cured in an autoclave under a pressurized $N_2$ blanket (5 Bars) for 16 hours to prevent bubble formation. Shrinkage was then determined as above.

vi) Bubble Test:

The formation of bubbles was determined by mixing the two components (A, B: Table 1) in the stated ratio, short speed mixing (800 rpm, 30 seconds) and allowing the adhesive to cure at ambient conditions. After 1 week, the cast film was optically inspected. In cases where bubbles were absent, the test was deemed passed.

vii) Glass Transition Temperature ($T_g$)

The glass transition temperature ($T_g$) was determined with fully cured compositions according to DIN EN ISO 11357-2: "Kunststoffe—Dynamische Differenz—Thermoanalyse (DSC)—Teil 2: Bestimmung der Glasübergangstemperatur and der Glasübergangsstufenhöhe" and utilizing a Q2000 Differential Scanning calorimeter (DSC), available from TA Instruments.

The following products were employed in the Examples:

Loctite CR 3502: 2-part, yellowish, polyurethane-based casting resin available from Henkel.

Loctite CR4100: 2-part, polyurethane-based resin available from Henkel.

Loctite UK 8050/UK 5050: 2-part, polyurethane-based adhesive available from Henkel Voranol CP260: Polyether triol having an hydroxyl equivalent weight of 87 g/eq., available from DowDuPont.

Quadrol L: Tetra (2-hydroxypropyl) ethylenediamine having an hydroxyl equivalent weight of 73.1 g/eq., available from BASF.

Jeffamine D-230 (hereinafter D230): Difunctional primary polyetheramine having an amine equivalent weight of approx. 119 g/eq., available from Huntsman International LLC.

Jeffamine T-403 (hereinafter T403): trifunctional primary polyetheramine having an amine equivalent weight of approx. 162 g/eq, available from Huntsman International LLC.

Jeffamine M-600 (hereinafter M600): monofunctional primary polyetheramine having an amine equivalent weight of approx. 582 g/eq, available from Huntsman International LLC.

Jeffamine D-400 (hereinafter D400): Difunctional primary polyetheramine having an amine equivalent weight of approx. 115 g/eq., available from Huntsman International LLC.

Dytek A (hereinafter DyA): Short-chain aliphatic primary diamine (2-methyl-1,5-diaminopentane) having an amine equivalent weight of approx. 58.1 g/eq., available as from Invista Arpadis.

Dytek DCH-99 (hereinafter DyDCH): Cycloaliphatic primary diamine (1,2-diaminocyclohexane, mixture of isomers) having an amine equivalent weight of approx. 57.1 g/eq., available as from Invista Arpadis.

N,N'-dimethyl hexanediamine (MAHMA): Aliphatic secondary diamine having an amine equivalent weight of approx. 72.13 g/eq., available from Sigma-Aldrich.

Aerosil R 202 (hereinafter R202): modified hydrophobic fumed silica, available from Evonik

Synthesis Example A1

A flask with overhead stirring was charged with trimethylolpropane (TMP, 34.73 g, 776 meq. OH) and tert-butyl acetoacetate (Lonza TBAA, 128.92 g, 815 mmol) at room temperature under a nitrogen atmosphere and subsequently heated to 120° C. The formed tert-butanol was collected in a Dean-Stark trap under a reflux condenser. After 4 hours of reaction, residues of tert-butanol and un-reacted TBAA were removed under reduced pressure at 140° C. The completion of reaction was confirmed by Infrared spectroscopy, specifically the disappearance of the OH band.

The desired product (A1) was obtained as a slightly yellow liquid with a Brookfield viscosity of 176 mPa·s at 25° C. (Spindle 2).

Synthesis Example A2

Compound A2 was synthesized according to the procedure of Synthesis Example A1, except that Voranol CP260 was used instead of TMP.

Synthesis Example A3

Compound A3 was synthesized according to the procedure of Synthesis Example A1, except that Quadrol L was used instead of TMP and that the reaction temperature did not exceed 80° C.

Potting Compositions

Reactive potting compositions were prepared by mixing Component A and Component B according to Table 1 herein below. In Table 1 the numbers correspond to percentages by weight, based on the total weight of the formulation; where applicable, the bracketed values correspond to molar equivalent percentages.

TABLE 1

| | Part A | | | | Part B | | | | | |
|---|---|---|---|---|---|---|---|---|---|---|
| | Loctite CR 3502 | A1 | A2 | A3 | Loctite CR 4100 | D230 | D400 | DyA | DyDCH | MAHMA |
| Comparative Example 1 | 100.00 | | | | 62.00 | | | | | |
| Ex. 1 | | 51.98 (100) | | | | 48.02 (100) | | | | |
| Ex. 2 | | 35.90 (100) | | | | | 64.10 (100) | | | |
| Ex. 3 | | 64.10 (100) | | | | | | | | 35.90 (100) |
| Ex. 4 | | 55.38 (100) | | | | 38.37 (75) | | 6.25 (25) | | |
| Ex. 5 | | 54.03 (100) | | | | | 28.95 (30) | 14.62 (60) | 2.40 (10) | |
| Ex. 6 | | 55.77 (100) | | | | | 15.46 (30) | 14.94 (15) | 13.84 (55) | |
| Ex. 7 | | | 58.69 (100) | | | 41.31 (100) | | | | |
| Ex. 8 | | | | 56.91 (100) | | 43.09 (100) | | | | |

Testing Results

In accordance with the protocols outlined above, Table 2 provides the results obtained from testing the potting compositions described in Table 1.

TABLE 2

|  | Initial Viscosity (mPa s) | Gel Time[a] (min) | Gel Time[b] (min) | Hardness after 12 min @50° C. | Time to reach Shore 75 A (hours) | Final Shore hardness | Bubble formation | Sterilization Resistance | Tg (° C.) |
|---|---|---|---|---|---|---|---|---|---|
| Comp. Ex. 1 | 1080[a] 1150[calcd] | 8.1 | 5.8 | 25 A | 3.0 | 97 A 45 D | Fail | Pass | 21 |
| Ex. 1 | 96[calcd] | n.d. | 10.6 | Liquid | 3.5 | 97 A 47 D | Pass | Pass | |
| Ex. 2 | 77[calcd] | n.d. | n.d. | Liquid | Never | 68 A 17 D | Pass | Pass | |
| Ex. 3 | 149[calcd] | n.d. | n.d. | Liquid | 3.5 | 97 A 64 D | Pass | Fail | |
| Ex. 4 | 101[calcd] | n.d. | 5.4 | 15 A | 1.5 | 92 A 25 D | Pass | Pass | |
| Ex. 5 | 880[a] 102[calcd] | 2.8 | 5.0 | 35 A | 2.0 | 95 A 47 D | Pass | Pass | 37 |
| Ex. 6 | 103[calcd] | 1.0 | 5.9 | 25 A | 1.5 | 96 A 59 D | Pass | Pass | 45 |
| Ex. 7 | 151[calcd] | n.d. | n.d. | Liquid | Never | 66 A 19 D | Pass | Pass | |
| Ex. 8 | 146[calcd] | n.d. | n.d. | Liquid | 3.5 | 94 A 73 D | Pass | Pass | | n.d.: Not Determined

The compositions according to Examples 1 to 3, 7 and 8 were found to be still liquid after 12 min which corresponds to a typical cycle time in hollow fibre processes. After continued curing at room temperature, polymers suitable for potting and bonding application were formed, as exemplified by the Shore hardness reached.

All compositions reached a shore hardness which was found to be suitable to pot, bond and further process hollow fibre filtration modules without harming the integrity of the cast hollow fibres. In particular, Examples 2 and 7 were found to suitable for spiral would filter bonding. In preferred applications, a certain thixotropy is required to ensure that an applied bead does not to spread too wide, but at the same time allows for penetration into the membrane layers. This can be achieved by adding a rheology modifier such as fumed silica, as can be seen in examples 11 and 12.

Table 3 summarizes a set of examples which show the applicability of the inventive composition in spiral wound filter modules. In this regard, the most important features are the ability to penetrate through filter membrane layers and chemical stability in a wide range of pH values since spiral wound filters are required to withstand several washing cycles in various pH ranges during their life time.

TABLE 3

| | Part A | | Part B | | | | | |
|---|---|---|---|---|---|---|---|---|
| | Loctite UK 8050 | A1 | Loctite UK 5050 | D230 | D400 | T403 | M600 | R202 |
| Comparative Example 2 | 45.95 | | 54.05 | | | | | |
| Ex. 10 | | 42.47 (100) | | 19.62 (50) | 37.92 (50) | | | |
| Ex. 11 | | 41.41 (100) | | 19.13 (50) | 36.97 (50) | | | 2.49 |
| Ex. 12 | | 38.73 (100) | | | | 44.82 (92) | 14.00 (8) | 2.45 | viii) Penetration Potential

The penetration potential of the inventive membrane was estimated by gel time measurements. The Brookfield method was used as described above under ii, a). It was surprisingly found that penetration of typical membranes was possible up to a viscosity of 15 Pas, determined at room temperature (23° C.+/−2° C.). The time it took to reach a viscosity of 15 Pas for selected composition is shown in Table 4.

TABLE 4

| Example | Pot Life |
|---|---|
| Comparative Example 2 | 14.3 min |
| Example 2 (Table 1) | 36.3 min |
| Example 10 | 20.5 min |
| Example 11 | 14.2 min |
| Example 12 | 10.2 min |

Typical production processes require a penetration of the adhesive for at least 10 min after application. As can be seen from the data of Table 4, all inventive examples show a very satisfactory penetration potential.

ix) Chemical Stability

The chemical stability of the inventive compositions was evaluated by bulk soak testing. For this purpose, six polymer disks of ca. 10 g with a width of ca. 10 mm were prepared from each adhesive formulation and cured for 7 days at room temperature. The weight of each disk was recorded, and the disk was immerged into an aqueous solution having a certain pH (pH 2.5, 3.5, 5. 7, 11.5, 12.5 and 13.5, respectively) and stored at 50° C. for 14 days. The respective solutions were prepared by diluting concentrated solutions of HCl (pH 2.5 to 5) and NaOH (pH 11.5 to 13.5) with deionized water until the desired pH value was reached. For the solution with pH 7, deionized water was used directly.

After the set time, the polymer samples were removed from the solutions and dried for 3 days on a paper towel at room temperature. Afterwards, the weight of each disk was again recorded. The disk was to be estimated to be chemically stable when the weight difference of the disk was less than 1.0%.

The bulk soak test was performed with Example 11 and Example 12. All of the prepared samples were found to be chemically stable in a pH range of 2.5 to 13.5.

This range is known to be sufficient in spiral wound filtration, for example, applications in sea water desalination, waste water treatment or food related application.

In view of the foregoing description and examples, it will be apparent to those skilled in the art that equivalent modifications thereof can be made without departing from the scope of the claims.

The invention claimed is:

1. A membrane filtration module comprising:
a housing in which a filtration membrane is disposed in a fixed positional relationship by a potting material, wherein the potting material is the reaction product of a two component (2K) composition consisting of:
a first component (A) comprising at least one compound (a) having at least two acetoacetate functional groups; and,
a second component (B) comprising at least one compound (b) having at least two amino groups, each said amino group being a primary or secondary amino group.

2. The membrane filtration module according to claim 1, wherein at least one of the compound (a) has:
a number average molecular weight (Mn) of less than 12000 g/mol; and/or,
an acetoacetoxy functionality of from 2 to 6.

3. The membrane filtration module according to claim 1, wherein Component A comprises at least one acetoacetylated polyol (a), said at least one acetoacetylated polyol being a reaction product of the following equation:

wherein: R is a $C_1$-$C_{12}$ alkyl group;
L denotes the backbone structure of the polyol; and, $q \geq 2$.

4. The membrane filtration module according to claim 3, wherein the polyol $L(OH)_q$ is a monomeric polyhydric alcohol.

5. The membrane filtration module according to claim 3, wherein the polyol $L(OH)_q$ is an oligomeric or polymeric polyhydric alcohol selected from the group consisting of: polyether polyols; polyester polyols; polyesteramide polyols; polycarbonate polyols; polybutadiene polyols; polyurethane polyols; polyacrylate polyols; and combinations thereof.

6. The membrane filtration module according to claim 3, wherein the polyol $L(OH)_q$ is an oligomeric or polymeric polyhydric alcohol having a number average molecular weight (Mn) of from 500 to 10000 g/mol.

7. The membrane filtration module according to claim 3, wherein the polyol $L(OH)_q$ is a polyether polyol selected from the group consisting of: poly(propylene oxide) polyol; poly(ethylene oxide) polyol; PTMEG, and mixtures thereof.

8. The membrane filtration module according to claim 1, wherein at least one of the compound (b) has:
a number average molecular weight of less than 5000 g/mol; and,
from 1 to 10 amino groups.

9. The filtration module according to claim 1, wherein component (B) comprises at least one polyoxyalkylene amine based on adducts of polyoxypropylene, polyoxyethylene and poly(oxyethylene)poly(oxypropylene) and having 2 or 3 amino groups, each said amino group being either a primary or a secondary amino group.

10. The membrane filtration module according to claim 1, wherein component (B) comprises at least one reactant amine in accordance with Formula (III):

$$R^2R^3NH \qquad \qquad \text{Formula (III)}$$

wherein:
$R^2$ is hydrogen or a $C_1$-$C_6$ alkyl group; and,
$R^3$ is a hydrocarbyl group having up to 36 carbon atoms which contains one or more aromatic groups, which hydrocarbyl group is optionally substituted by one or more —$NHR^2$ groups and is further optionally interrupted by one or more O atoms and/or by one or more —NH— groups; or,
$R^3$ is a $C_1$-$C_{36}$ aliphatic group which is optionally substituted by one or more —$NHR^2$ groups and which is further optionally interrupted by one or more O atoms and/or by one or more —NH— groups; and,
$R^2$ and $R^3$ may form a ring together with the N-atom to which they are bound.

11. The membrane filtration module according to claim 1, wherein the two component (2K) composition is free of catalysts.

12. A method of making a hollow fiber membrane module, comprising:
i) providing a two component (2K) composition, said composition consisting of:
a first component (A) comprising at least one compound (a) having at least two acetoacetate functional groups; and,
a second component (B) comprising at least one compound (b) having at least two amino groups, each said amino group being a primary or secondary amino group;
ii) mixing component (A) and component (B) of the two component (2K) composition to make a curable mixed composition;
iii) providing a plurality of hollow fiber membranes, the plurality of hollow fiber membranes comprising an end portion;
iv) applying the curable mixed composition onto the end portion; and
v) allowing the curable composition to solidify and cure, thereby potting said at least one end portion of the plurality of hollow fiber membranes.

13. A method of making a spiral wound filtration module, said spiral wound filtration module comprising a permeate collection tube and one or more membrane leaf packet(s) wound about said collection tube, each membrane leaf packet having first and second membrane sheets in between which sheets is disposed a permeate spacer and wherein each said membrane sheet has a membrane side and a backing side, the method comprising:
i) providing a two component (2K) composition, said composition consisting of:
a first component (A) comprising at least one compound (a) having at least two acetoacetate functional groups; and, a second component (B) comprising at least one compound (b) having at least two amino groups, each said amino group being a primary or secondary amino group;

ii) mixing component (A) and component (B) of the two component (2K) composition to make a curable mixed composition;

iii) applying the curable mixed composition onto at least a portion of the backing side of the first membrane sheet;

iv) disposing the permeate spacer over the backing side of the first membrane sheet and into contact with the applied curable mixed composition;

v) disposing the backing side of the second membrane sheet over the permeate spacer to form one said membrane leaf packet;

vi) winding the membrane leaf packet around the permeate collection tube; and vii) allowing the curable composition to solidify and cure, thereby bonding the backing side of the second membrane sheet to the backing side of the first membrane sheet.

14. The method of claim 13 wherein the first membrane sheet comprises a plurality of edges and the step of applying the curable mixed composition onto at least a portion of the backing side of the first membrane sheet comprises applying the curable mixed composition along adjacent one or more edges of the first membrane leaf.

15. The method of claim 12 wherein the at least one compound (b) is selected from i) polyoxyalkylene amine based on adducts of polyoxypropylene, polyoxyethylene and poly(oxyethylene)poly(oxypropylene) and having 2 or 3 amino groups, each said amino group being either a primary or a secondary amino group; ii) at least one reactant amine in accordance with Formula (III):

$$R^2R^3NH \qquad \text{Formula (III)}$$

wherein: $R^2$ is hydrogen or a $C_1$-$C_6$ alkyl group; and, $R^3$ is a hydrocarbyl group having up to 36 carbon atoms which contains aromatic groups, which hydrocarbyl group is optionally substituted by one or more —$NHR^2$ groups and is further optionally interrupted by one or more O atoms and/or by one or more —$N(R^4)$— groups of which $R^4$ is a hydrogen atom; or, $R^3$ is a $C_1$-$C_{36}$ aliphatic group which is optionally substituted by one or more —$NHR^2$ groups and which is further optionally interrupted by one or more O atoms and/or by one or more —$N(R^4)$— groups of which $R^4$ is a hydrogen atom; and, $R^2$ and $R^3$ may form a ring together with the N-atom to which they are bound; or a combination of i) and ii).

16. The filtration module according to claim 1, wherein the reaction product is a cured reaction product.

* * * * *

UNITED STATES PATENT AND TRADEMARK OFFICE
CERTIFICATE OF CORRECTION

PATENT NO. : 11,433,357 B2  
APPLICATION NO. : 16/906582  
DATED : September 6, 2022  
INVENTOR(S) : Olaf Hartmann et al.

Page 1 of 1

It is certified that error appears in the above-identified patent and that said Letters Patent is hereby corrected as shown below:

In the Specification

Column 8, Line 62 change "Tensiden and" to --Tensiden und--.

Column 8, Line 63 change "CA/17b (53)" to --C-V 17b (53)--.

Column 14, Line 10 change "4-am inopiperidine" to --4-aminopiperidine--.

Column 14, Line 25 change "pyrolidine" to --pyrollidine--.

Column 20, Line 19 change "and der" to --und der--.

Signed and Sealed this  
Twenty-seventh Day of June, 2023

Katherine Kelly Vidal  
*Director of the United States Patent and Trademark Office*